United States Patent
Shelekhin et al.

(10) Patent No.: US 6,780,539 B2
(45) Date of Patent: Aug. 24, 2004

(54) ALKALINE BATTERY WITH FLAT HOUSING

(75) Inventors: Alexander Shelekhin, Ridgefield, CT (US); Steven J. Specht, Brookfield, CT (US); Robert S. Ferrin, Bethel, CT (US); Derek R. Bobowick, Sandy Hook, CT (US)

(73) Assignee: The Gillette Company, Boston, MA (US)

( * ) Notice: Subject to any disclaimer, the term of this patent is extended or adjusted under 35 U.S.C. 154(b) by 352 days.

(21) Appl. No.: 10/080,294

(22) Filed: Feb. 21, 2002

(65) Prior Publication Data

US 2003/0157403 A1 Aug. 21, 2003

(51) Int. Cl.[7] .............................. H01M 2/02; H01M 6/46
(52) U.S. Cl. ...................... 429/159; 429/162; 429/176; 429/177; 429/206
(58) Field of Search ................................ 429/159, 206, 429/177, 162, 176

(56) References Cited

U.S. PATENT DOCUMENTS

| | | | |
|---|---|---|---|
| 2,658,936 A | 11/1953 | Rock | |
| 2,677,716 A | 5/1954 | MacFarland | |
| 2,774,806 A | 12/1956 | Jobe | |
| 3,442,709 A | * 5/1969 | Hayase | 429/54 |
| 3,907,599 A | 9/1975 | Fanciullo | |
| 4,675,259 A | * 6/1987 | Totty | 429/157 |
| 4,816,354 A | * 3/1989 | Tamminen | 429/162 |
| 5,691,079 A | 11/1997 | Daugaard | |

* cited by examiner

*Primary Examiner*—John S. Maples
(74) *Attorney, Agent, or Firm*—Barry D. Josephs; Paul I. Douglas; Thomas G. Krivulka

(57) ABSTRACT

A flat elongated alkaline battery comprising an outer metal housing and plurality of individual alkaline cells housed therein. The outer housing has at least a major surface which is a flat polygon. Preferably the outer metal housing is a cuboid. The individual cells comprise an anode slab comprising zinc, cathode slab, comprising manganese dioxide and separator therebetween. Each cell is formed by stacking the anode, separator, and cathode body to body. Each cell has at least one surface which is polygonal. The individual cells are preferably aligned in a row edge to edge to form a pack of cells having the same thickness as the thickness of an individual cell. The pack of cells are inserted into a common hydrogen permeable plastic container and encased therein. The cells encased in the plastic container are housed within the interior of the metal outer casing. The cells are electrically connected in parallel to the battery positive and negative terminals.

28 Claims, 5 Drawing Sheets

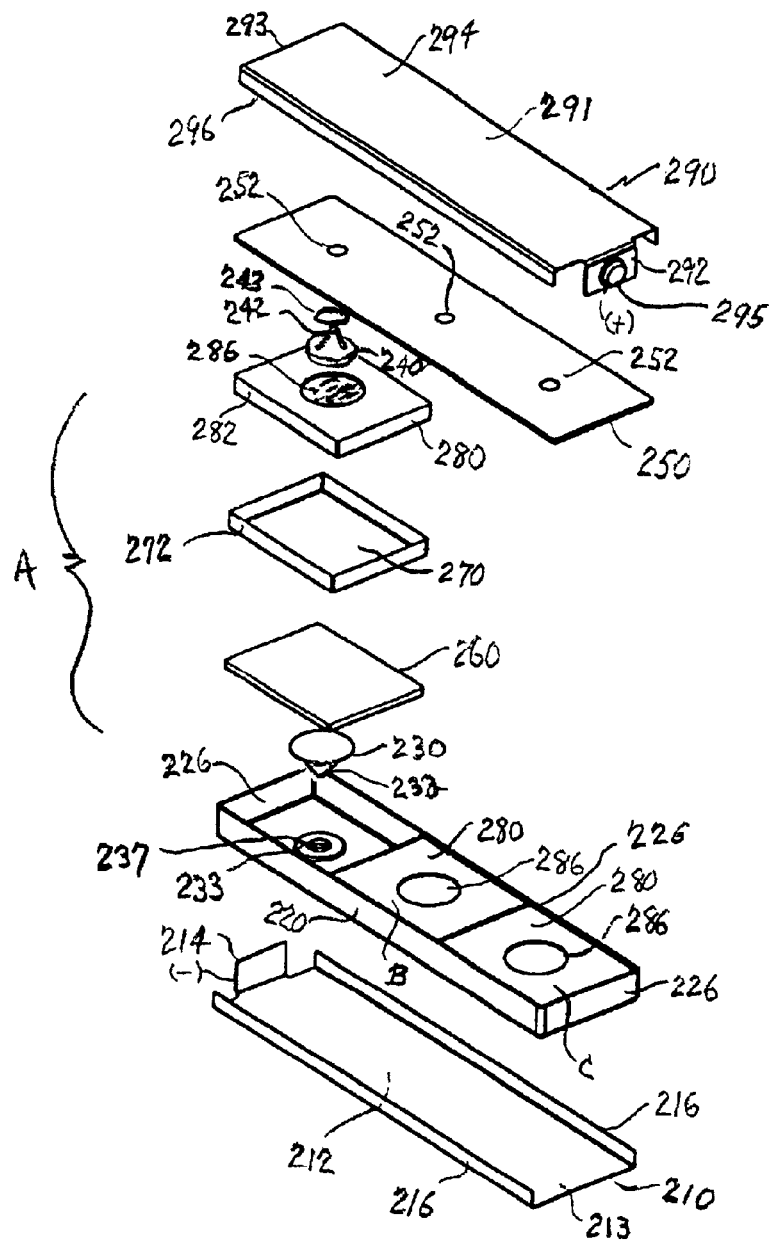
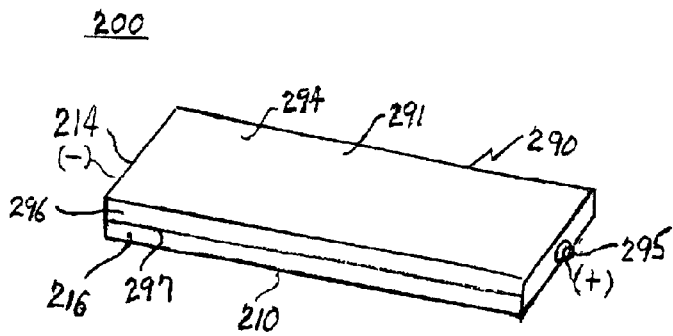
Fig. 2
Fig. 2A

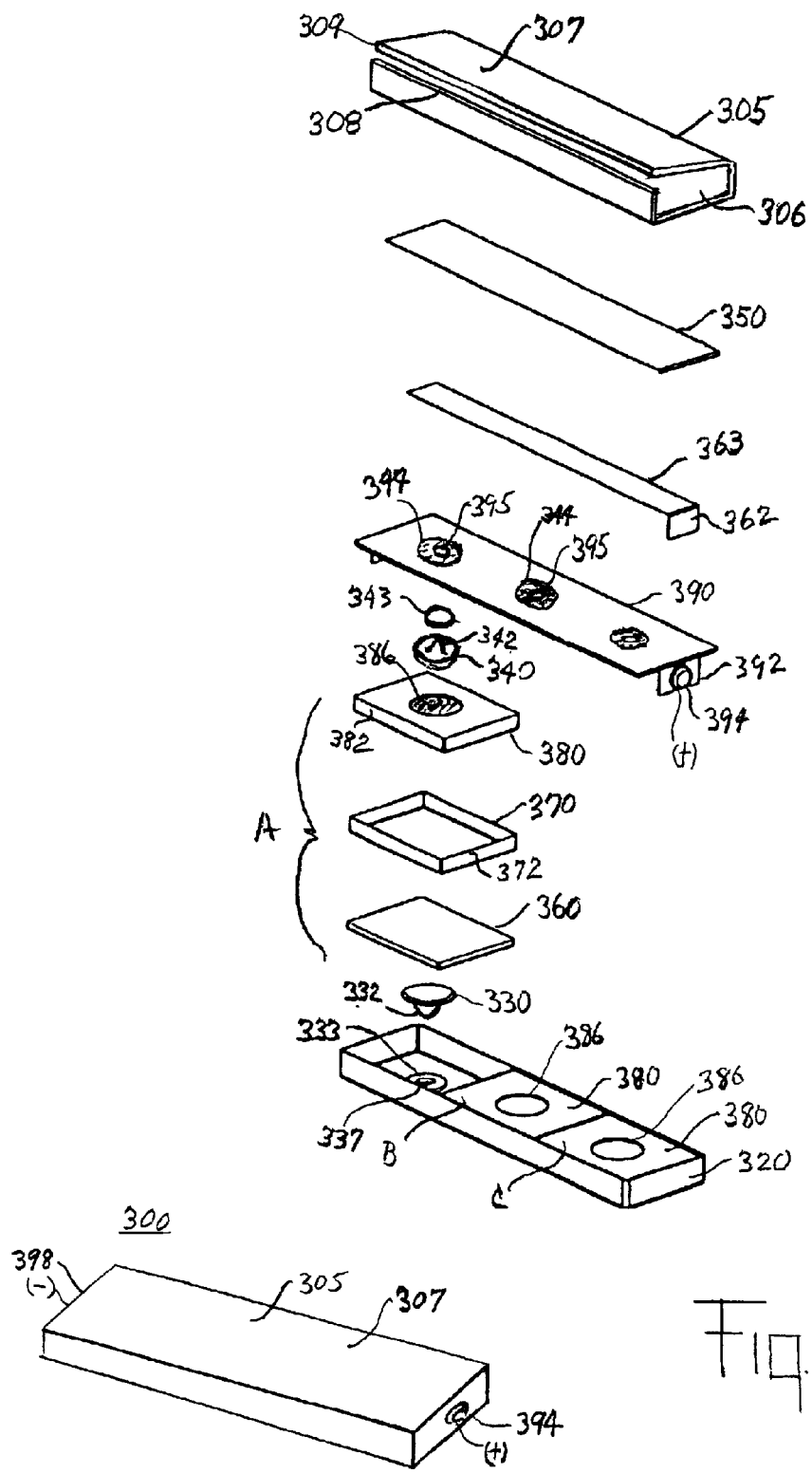

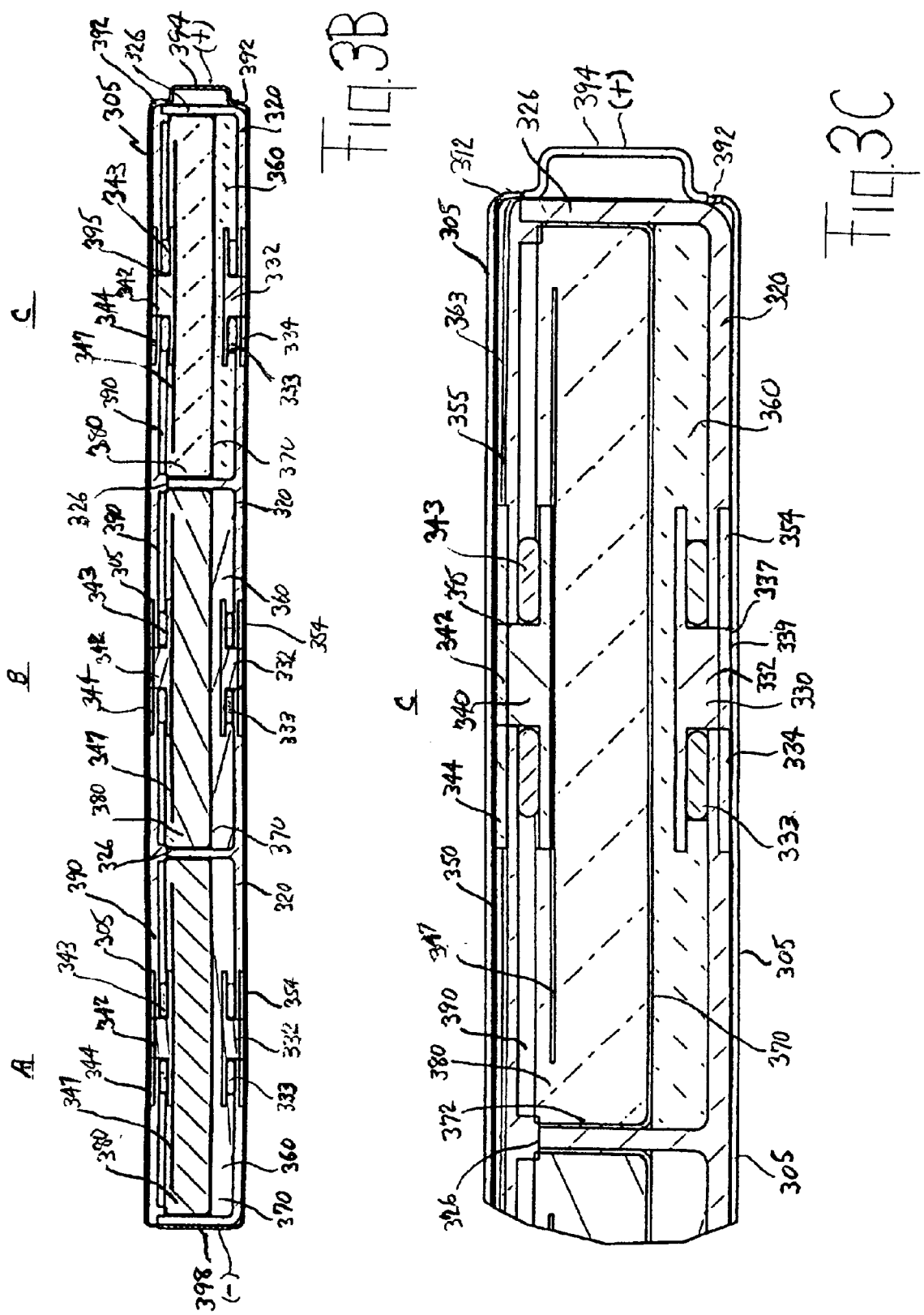

ALKALINE BATTERY WITH FLAT HOUSING

FIELD OF THE INVENTION

The invention relates to an alkaline battery having a substantially flat outer housing. The invention relates to alkaline battery having an anode comprising zinc, a cathode comprising manganese dioxide, and an electrolyte comprising aqueous potassium hydroxide.

BACKGROUND

Conventional alkaline electrochemical cells have an anode comprising zinc and a cathode comprising manganese dioxide. The cell is typically formed of a cylindrical outer housing (casing). The fresh cell has an open circuit voltage (EMF) of about 1.5 volt and typical average running voltage of between about 1.0 to 1.2 Volt in medium drain service (100 to 300 milliamp.) The cylindrical housing is initially formed with an enlarged open end and opposing closed end. After the cell contents are supplied, an end cap with insulating plug is inserted into the open end to form the negative terminal. The cell's open end is closed by crimping the housing edge over an edge of the insulating plug and radially compressing the housing around the insulating plug to provide a tight seal. A portion of the cell housing at the opposing closed end forms the positive terminal.

Primary alkaline electrochemical cells typically include a zinc anode active material, an alkaline electrolyte, a manganese dioxide cathode active material, and an electrolyte permeable separator film, typically of cellulose or cellulosic and polyvinylalcohol fibers. The anode active material can include for example, zinc particles admixed with conventional gelling agents, such as sodium carboxymethyl cellulose or the sodium salt of an acrylic acid copolymer, and an electrolyte. The gelling agent serves to suspend the zinc particles and to maintain them in contact with one another. Typically, a conductive metal nail inserted into the anode active material serves as the anode current collector, which is electrically connected to the negative terminal end cap. The electrolyte can be an aqueous solution of an alkali metal hydroxide for example, potassium hydroxide, sodium hydroxide or lithium hydroxide. The cathode typically includes particulate manganese dioxide as the electrochemically active material admixed with an electrically conductive additive, typically graphite material, to enhance electrical conductivity. Optionally, small amount of polymeric binders, for example polyethylene binder and other additives, such as titanium-containing compounds can be added to the cathode.

The manganese dioxide used in the cathode is preferably electrolytic manganese dioxide (EMD) which is made by direct electrolysis of a bath of manganese sulfate and sulfuric acid. The EMD is desirable, since it has a high density and high purity. The electrical conductivity (resistivity) of EMD is fairly low. An electrically conductive material is added to the cathode mixture to improve the electric conductivity between individual manganese dioxide particles. Such electrically conductive additive also improves electric conductivity between the manganese dioxide particles and the cell housing, which also serves as cathode current collector in conventional cylindrical alkaline cells. Suitable electrically conductive additives can include, for example, graphite, graphitic matererial, conductive carbon powders, such as carbon blacks, including acetylene blacks. Preferably the conductive material comprises flaky crystalline natural graphite, or flaky crystalline synthetic graphite, including expanded or exfoliated graphite or graphitic carbon nanofibers and mixtures thereof.

There are small size rectangular shaped rechargeable batteries now available, which are used to power small electronic devices such as MP3 audio players and mini disk (MD) players. These batteries are typically in the shape of a small cuboid (rectangular parallelepiped) somewhat the size of a pack of chewing gum. Such batteries, for example, can be in the form of replaceable rechargeable nickel metal hydride (NiMH) size F6 or 7/5F6 size cuboids in accordance with the standard size for such batteries as set forth by the International Electrotechnical Commission (IEC). The F6 size has a thickness of 6.1 mm, width of 17.3 mm and length of 35.7 mm. There is a version of the F6 size wherein the length can be as great as about 48.0 mm. The 7/5F6 size has thickness of 6.1 mm, width of 17.3 mm, and length of 67.3 mm. According to the IEC standard allowed deviation for the 7/5F6 size in thickness is +0 mm, −0.7 mm, in width is +0 mm, −1 mm, and in length is +0, −1.5 mm. The average running voltage of the F6 or 7/5F6 NiMH rechargeable batteries when used to power miniature MP3 audio or mini disk (MD) players is between about 1.1 and 1.4 volt typically about 1.12 volt When used to power the mini disk (MD) player the battery is drained at a rate of between about 200 and 250 milliAmp. When used to power an MP3 player the battery is drained typically at a rate of about 100 milliAmp.

It would be desirable to have a small flat alkaline battery of the same size and shape as small size cuboid shaped (rectangular parallelepiped) nickel metal hydride batteries, so that the small alkaline size battery can be used interchangeably with the nickel metal hydride battery to power small electronic devices such as mini disk or MP3 players.

It would be desirable to use a primary (nonrechargeble) alkaline battery as a replacement for small rectangular shaped rechargeable batteries, particularly small size nickel metal hydride rechargeable battery.

SUMMARY OF THE INVENTION

An aspect the invention is directed to a primary (nonrechargeable) alkaline battery having an elongated substantially flat outer housing with a plurality of individual alkaline cells therein. The number of cells within the battery may typically be between about 2 and 5 cells or greater, preferably between 3 and 5 cells. The outer metal housing comprises an elongated metal body surface with a major portion thereof having at least one flat polygonal shape. The body surface defines an interior space for housing the individual cells. The outer metal housing includes a pair of opposing ends, contiguous to opposing edges of the body surface. The negative terminal, preferably resides at one end of the metal housing and the positive terminal at the other end but is preferably insulated from contact with the metal body surface. Each cell has an anode, comprising zinc, a cathode comprising manganese dioxide, and alkaline electrolyte, preferably aqueous potassiium hydroxide. The anode and cathode preferably are in the form of a slab having a major portion of their surface flat. The individual cells have at least one substantially flat surface. The individual cells are preferably polyhedrons. Desirably the cells have an overall polygonal shape of relatively small thickness. The cell has two opposing major surfaces and a peripheral edge surface therebetween. The cell thickness defines the cell edge surface. Desirably, the individual cells within the battery are of the same shape and size. The cells are inserted into a plastic casing which is permeable to hydrogen. The individual cells are aligned in a row in edge to edge arrangement to form a pack of cells within a common plastic container so that the thickness of the aligned pack of cells is the same as the thickness of an individual cell. The plastic casing is sealed and then inserted into the interior of the outer metal housing. The cells are electrically connected in parallel to the battery positive and negative terminals.

The anode of each cell is desirably electrically connected to the outer metal housing which in turn is connected to the battery's negative terminal. Preferably pass thru conductor tips, which protrude from apertures in the plastic housing are used to connect the anodes of each cell to the outer metal housing. The cathodes of each cell are electrically connected to the battery positive terminal which is insulated from the outer housing. Preferably pass thru conductor tips, which protrude from apertures in the plastic casing are used to connect the cathode of each cell to the positive terminal.

In another aspect the invention is directed to an alkaline battery having an elongated substantially flat outer metal housing with a single individual alkaline cell therein. The outer metal housing comprises an elongated metal body surface with a major portion thereof having at least one flat polygonal shape. The body surface defines an interior space for housing the individual cells. The outer metal housing includes a pair of opposing ends, contiguous to opposing edges of the body surface. The battery positive terminal, preferably resides at one end and the negative terminal at the other. The single cell has an anode comprising zinc, a cathode comprising manganese dioxide, and alkaline electrolyte, preferably aqueous potassiium hydroxide. The single cell has at least one substantially flat surface. The cell is preferably a polyhedron. Desirably the cell has an overall polygonal shape of relatively small thickness. The cell has two opposing major surfaces and a peripheral edge surface therebetween. The cell thickness defines the cell edge surface. The cell is inserted into a plastic casing which is permeable to hydrogen. The plastic casing is sealed and then inserted into the interior of the outer metal housing. The cell is electrically connected in parallel to the battery positive and negative terminals. The cell's anode is desirably electrically connected to the outer metal housing which in turn is connected to the battery's negative terminal. Preferably pass thru conductor tips, which protrude from apertures in the plastic casing are used to connect the anode to the outer metal housing. Preferably pass thru conductor tips, which protrude from apertures in the plastic casing, are used to connect the cathode to the positive terminal. The positive terminal is insulated from the outer metal housing.

In a principal aspect the battery of the invention has an overall cuboid (rectangular parallelepiped) shape. The individual cell or plurality of cells are preferably also of cuboid shape. In such embodiments the outer metal housing has a body surface which comprises two pair of opposing rectangular sides and a pair of opposing ends which are rectangular. The battery size within such configuration can be readily adjusted to form small size as well as larger size flat batteries. In a desired embodiment the battery of the invention has overall cuboid dimensions equal to the dimensions of small size replaceable nickel metal hydride batteries of the F6 or 7/5F6 size as set for by the International Electrotechnical Commission. The battery of the invention has about the same running voltage as that of the nickel metal hydride rechargeable battery and can be used as replacement for such rechargeable battery, particularly for powering small electronic devices such as MP3 players and mini disk (MD) audio players.

BRIEF DESCRIPTION OF THE DRAWINGS

FIG. 2 is an exploded view showing the components of a second embodiment of the flat alkaline battery of the invention having three cells connected in parallel therein.

FIG. 2A is a perspective view of the battery comprising the components shown in FIG. 2.

FIG. 3 is an exploded view showing the components of a third embodiment of the flat alkaline battery of the invention having three cells connected in parallel therein.

FIG. 3A is a perspective view of the battery comprising the components shown in FIG. 3.

FIG. 3B is a longitudinal cross section of the battery of FIG. 3A.

FIG. 3C is an enlarged longitudinal cross section of one of the three cells within the battery of FIG. 3A.

DETAILED DESCRIPTION

Figure 1:
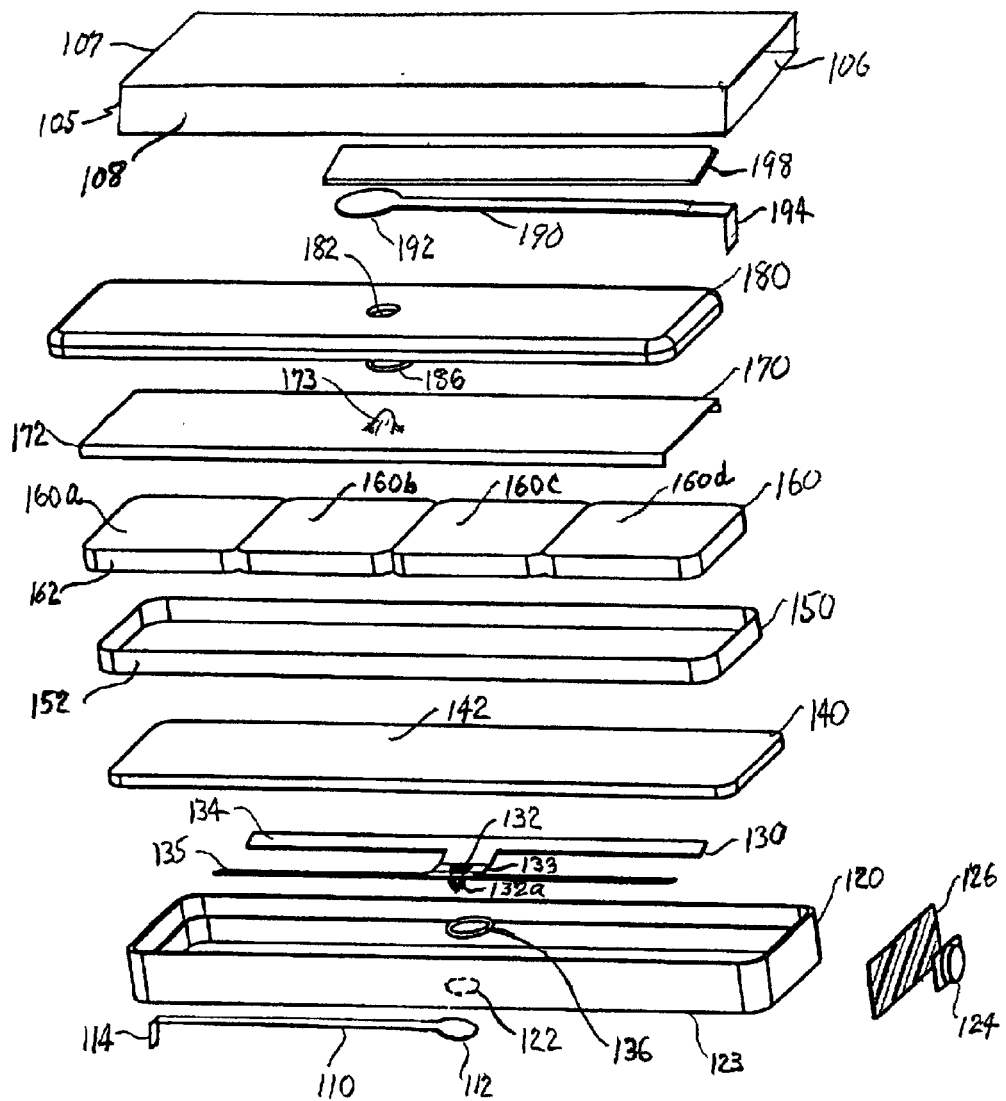
FIG. 1 is an exploded view showing the components of a first embodiment of the flat alkaline battery of the invention having a single cell.
Figure 1A:
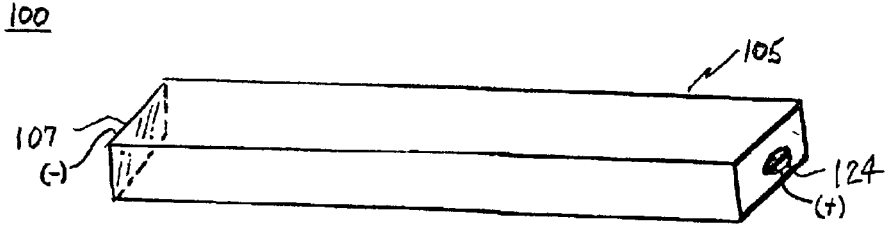
FIG. 1A is a perspective view of the battery comprising the components shown in FIG. 1.

First Embodiment (FIGS. 1–1A)

An embodiment of the flat alkaline primary battery of the invention is shown in FIGS. 1–1A. In a preferred embodiment the finished battery 100 has the overall shape of a cuboid (rectangular parallelepiped) similar to an 7/5F6 size (IEC standard) rechargeable battery. Such battery has the overall cuboid shape shown in FIG. 1A with a length of about 67 mm, width of 17 mm and thickness of 6 mm. For example, the battery 100 of the invention can be used as a replacement for the 7/5F6 size nickel metal hydride rechargeable batteries as power source for electronic devices such as the mini disk (MD) player model MZ-900 from Sony Corp. Such replacement service is offered by way of example and is not intended to be limiting. The embodiment of the battery shown in FIGS. 1–1A can be made in larger or smaller sizes.

The embodiment of FIG. 1 shows the components of a single cell which are assembled into battery 100 shown in FIG. 1A. The single cell has an anode 140 electrically connected to the negative terminal 107 on outer metal housing 105 and a cathode 160 electrically connected to the positive terminal 124.

The components of this embodiment is shown best in the exploded view of FIG. 1. The outer housing 105 has a cuboid shape which is open at one end 106. The opposing closed end 107 forms the negative terminal. When the battery is assembled, the housing 105 is thus electrically negative during discharge. The assembled battery is shown in FIG. 1A. Outer housing 105 is desirably formed of a nickel plated cold rolled steel or stainless steel sheet which can be drawn into the desired shape shown in FIG. 1. Outer housing 105 has a wall thickness desirably between about 10 to 15 mil (0.25 to 0.38 mm). A durable plastic material could be used instead of metal for outer housing 105. However, such plastic outer housing 105 would typically be of greater thickness than a metal housing 105, and this would reduce the available internal volume within battery 100 for anode and cathode active materials. During assembly the components shown in FIG. 1 are assembled into a unit and inserted into the open end 106 of outer housing 105.

The internal cell components are shown in FIG. 1. The finished battery 100 (FIG. 1A) comprises one cell. The cell has two opposing major surfaces and a peripheral edge surface therebetween. The cell is preferably of cuboid shape, preferably of small thickness so that it can fit into outer housing 105. In that shape the two opposing major surfaces are the opposing large faces of the cuboid and the peripheral edge surface is the surface therebetween running along the cell thickness. The cell comprises a cathode 160 comprising $MnO_2$, an anode 140 comprising zinc, and a separator 150 therebetween. Separator 150 is permeable to alkaline electrolyte, preferably aqueous potassium hydroxide. The anode 140 and cathode 160 are substantially rectangular slabs of small thickness. Anode slab 140, separator 150, and cathode slab 160 are stacked body to body (as in a stack of coins) as shown in FIG. 1. The phrase anode and cathode slabs "stacked body to body" as used herein with respect to all embodiments shall be understood to mean that the anode and cathode are stacked one on top of the other (with the separator therebetween) so that a major surface of the anode and a major surface of the cathode are adjacent to and face each other (as in a stack of coins). The cathode 160 is itself conveniently fabricated from multiple rectangular or square slabs of small thickness comprising $MnO_2$. The $MnO_2$ slabs, e.g. four slabs 160a–160d are aligned in a row, edge to edge (like floor tile) and laterally pressed together to form the final cathode 160 so that the thickness of the cathode 160 is the same as the thickness of each of the individual blocks. It has been determined advantageous to fabricate the cathode 160 in such manner from multiple individual $MnO_2$ slabs instead of manufacturing one single elongated $MnO_2$ slab. Manufacture of a single $MnO_2$ slab having a length approximately equal to the length of housing 105, would be more prone to breakage during the manufacturing process. It will be appreciated that although the cathode 160 is fabricated from individual $MnO_2$ slabs, when the $MnO_2$ slabs are laterally pressed together as shown in FIG. 1 a single cathode 160 is formed. Anode 140 is preferably a rectangular slab comprising particulate zinc. The separator 150 has a flat rectangular surface with upwardly extending edges. The separator is large enough so that as cathode 160 is placed onto separator 150, the separator surface contacts the lower surface of the cathode and the separator edges 152 extend upwardly to cover the cathode edges 162.

The plastic container for the individual cells comprises a rectangular shaped plastic tray 120 which is fitted with a plastic tray cover 180. The plastic tray cover 180 can be solvent bonded or ultrasonically welded or glued to the top edge of tray 120 after the cell components have been inserted into tray 120. Plastic tray 120 and tray cover 180 are formed of plastic material which is desirably permeable to hydrogen gas but will prevent electrolyte from escaping to the environment outside of the tray. This prevents leakage of electrolyte from the battery. Preferred plastic material for tray 120 and tray cover 180 is gas permeable polyethylene, polypropylene, nylon, and polysulfone. The outer housing 105 is not hermetically sealed at end 106. There are tiny pathways (not shown) around the positive terminal cover 126 through which hydrogen gas buildup from within the cell permeates through plastic tray 120 and tray cover 180 and releases to the external environment.

Electrical connection of the cathode 160 to the positive terminal 124 is made in the following manner: The plastic tray cover 180 has one aperture 182 thererthrough. Aperture 182 is aligned with the center of cathode 160. The cathode 160 can be seated within separator 150. A metal sheet 170 can be aligned under plastic tray cover 180. A sealing ring 186, typically of rubber, can be placed on the top surface of metal sheet 170 and aligned so that it is directly under aperture 182. The metal sheet 170 can then be applied to contact the undersurface of plastic tray 180 so that the sealing ring is directly under and circumvents aperture 182. An awl or punch can be pressed onto the underside of metal sheet 170 to form a passthrough conductor tip 173 which passes through aperture 182 and protrudes slightly from the top surface of the plastic tray cover 180. Conductor tip 173 functions as a positive pass thru conductor since it provides a conductive path from the cathode 160 to the positive terminal 124 by way of a conductive metal strip 190, typically of copper or brass. The metal strip 190 (positive conductor strip) is welded at one end 192 to pass thru conductor tip 173 and at the other end 194 to positive terminal 124. Specifically, as shown in FIG. 1 conductor strip 190 can be provided with an integrally formed flat circular or semicircular surface 192 at one end and a downwardly extending integrally formed surface 194 at the other end. End 192 can be spot welded to pass thru conductor tip 173 protruding from aperture 182 of plastic tray cover 180. The opposite end 194 of conductor strip 190 can be welded to positive terminal tip 124. After end 192 of conductor strip 190 is welded to pass thru tip 173 the metal sheet 170 becomes securely fastened to plastic tray cover 180. Metal sheet 170, attached to plastic tray cover 180, can now be pressed into contact with the top surface of cathode 160 so that the bottom surface of metal sheet 170 contacts the top surface of cathode 160. In such assembly the metal sheet 170 becomes the cathode current collector. An insulator sheet 198 can then be applied to cover metal strip 190. Insulator sheet 198 prevents electrical contact between the cathode 160 and the outer housing 105 when the cell is inserted into housing 105.

Anode slab 140 can be applied by pressing it to the underside surface of separator 150 so that anode 140 faces cathode 160 with separator 150 therebetween. A sheet of metal 130 which functions as an anode current collector, can be placed against the bottom surface of anode slab 140. The anode current collector 130 in the specific embodiment shown in FIG. 1 can be conveniently fabricated in the form of single conductive sheet having two parallel rungs 134 and 135. The parallel rungs 134 and 135 are spaced apart and integrally connected at their center by an integrally formed connector piece 133 having a solid central portion 132 therein. The connector piece 133 is preferably slightly curved so that it bulges outwardly on the side facing the bottom surface 123 of plastic tray 120. The bottom 123 of plastic tray 120 has an aperture 122 therein at about the center of the plastic tray.

In assembling the cell components a sealing ring, typically of rubber is inserted within plastic tray 120 so that it lies directly over aperture 122 in the bottom surface 123 of the tray. The anode current collector 130 can be inserted into plastic tray 120 so that the rungs 134 and 135 of anode current collector 130 run along the length of the tray interior. The anode current collector 130 is positioned so that the curved connector piece 133 at the center of the anode current collector 130 is aligned directly over aperture 122 within the bottom surface 123 of plastic tray 120. The sealing ring 136 lies between apertures 122 of the tray and curved connector piece 133 of the anode current collector. An awl or punch can then be used to press central portion 132 of connector piece 133 through the sealing ring 136 and aperture 122. A pass thru tip 132*a* is formed which protrudes from aperture 122 at the bottom surface 123 of tray 120. A conductive strip 110 (negative conductor) is provided to connect the protruding tip 132 of the anode current collector 130 with the negative terminal 107 of the housing 105. The conductor strip 110, typically of brass or copper, has a circular or semicircular integrally formed flat portion 112 at one end and a downwardly extending integrally formed surface 114 at the other end. The conductive strip 110 is positioned on the external side of the bottom 123 of plastic tray 120 so that flat end 112 faces aperture 122 as shown in FIG. 1. The flat end 112 of conductor strip 110 is then welded to pass thru tip 132*a* protruding from aperture 122. The other end 114 of the conductor strip 110 can be welded to the negative terminal 107 at the closed end of outer housing 105 after the plastic tray with internal cell components are inserted into housing 105.

In further assembling the cell components into tray 120, the anode slab 140 can then be placed into tray 120 over anode current collector 130. The separator 150 containing cathode 160 can be placed over anode slab 140 within plastic tray 120 so that the separator 150 lies between anode 140 and cathode 160. The plastic tray cover 180 is secured to cathode current collector 170 as above described by means of pass thru conductor 173 tip of the cathode current collector 170 welded to end 192 of the positive conductor strip 190. The unit comprising cathode current collector metal sheet 170 secured to tray cover 180 is then inserted over cathode 160 so that the cathode current collector metal sheet 170 contacts the top surface of cathode 160. The edge of tray cover 180 can then be ultrasonically welded or glued to the edge of plastic tray 120 in order to form a tightly sealed plastic container housing the cell components.

Electrical connection between anode 140 and the negative terminal 107 at the closed end of housing 105 can be made after the closed plastic tray 120 with cell components therein are inserted into housing 105 through the housing open end 106. This is achieved as described above by welding end 114 of the conductor strip 110 to the negative terminal 107 at the closed end of outer metal housing 105. The open end 106 of housing 105 is sealed with a plastic positive terminal cover 126 which can be welded ultrasonically to the housing 105. The positive terminal 124 is in turn welded or glued to the exterior of plastic positive terminal cover 126. The positive electrical connection between cathode 160 and positive terminal 124 is made as described above by welding end 194 of conductor strip 190 to positive terminal 124 without melting the surrounding plastic. The insulator sheet 198 over conductor strip 190 prevents electrical contact between the cathode 160 and the negative outer housing 105. Outer metal housing 105 is not hermetically sealed. There are therefore very small pathways or openings (not shown) at the positive terminal end 124, e.g. around plastic positive terminal cover 126, through which hydrogen gas buildup from within the cell, once it permeates through plastic tray 120 and tray cover 180, can release to the external environment.

Figures 2B, 2C:
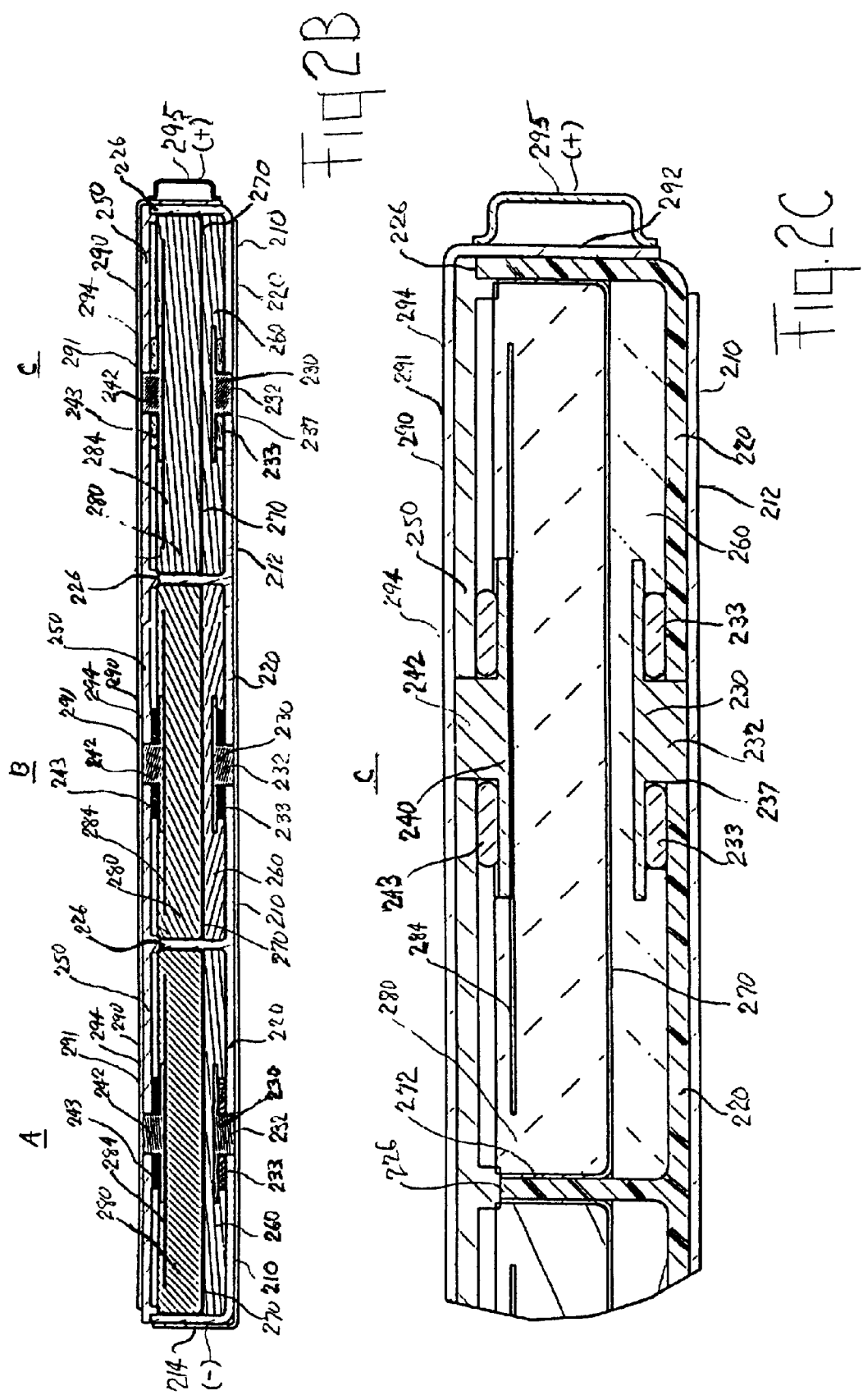
FIG. 2B is a longitudinal cross section of the battery of FIG. 2A.
FIG. 2C is an enlarged longitudinal cross section of one of the three cells.

Second Embodiment (FIGS. 2–2C)

Another embodiment of the flat alkaline primary battery of the invention is shown in FIGS. 2–2C. In a preferred embodiment the battery shown in FIGS. 2–2C has the overall shape of a cuboid (rectangular parallelepiped) similar to an F6 size (IEC standard) rechargeable battery. Such battery has the overall cuboid shape shown in FIG. 2A with a length of 67 mm, width of 17 mm and thickness of 6 mm. In particular the battery of the invention shown in FIGS. 2–2C can be used as a direct replacement for the 7/5F6 size nickel metal hydride rechargeable batteries as power source for the mini disk Walkman player model MZ-900 from Sony Corp. Such replacement service is offered by way of example and is not intended to be limiting. The embodiment of the battery shown in FIGS. 2–2C can be made in larger of smaller sizes.

The embodiment of FIGS. 2–2C shows the components of three cells electrically connected in parallel to form battery 200. However, it will be appreciated that there can be fewer cells, for example 2 cells, or a greater amount, for example 4 or 5 cells, all fabricated in the same manner with the same internal components shown and described with respect to the embodiment shown in FIGS. 2–2C.

The components of this embodiment is shown best in the exploded view of FIG. 2. The outer housing 290 is formed of a top section 291 and a bottom section 210. The top section 291 is formed of an elongated flat metal panel 294, having a pair of integrally formed downwardly bent edges 296 on opposing long sides of said metal panel 294. A small integrally formed portion 292 is bent downwardly along one of the ends of metal panel 294 with opposite end 293 being left open. A terminal pip 295 which forms the positive terminal of the battery is welded to plate 292. The top section 291 is desirably formed of nickel plated cold rolled steel or stainless steel having a thickness desirably of between about 10 and 20 mil (0.254 and 0.508 mm), preferably about 15 mil (0.037 mm).

Similarly, the bottom section 210 of outer housing 290 is formed of an elongated flat metal panel 212, having a pair of integrally formed upwardly bent edges 216 on opposing long sides of said metal panel 212. A small integrally formed portion 214 is bent upwardly along one of the ends of metal panel 212. The upwardly bent integrally formed portion 214 forms the negative terminal of the battery. The bottom section 210 is desirably formed of nickel plated cold rolled steel or stainless steel. The top section 291 and bottom section 210 of outer metal housing 290 are oriented so that the positive terminal pip 295 and negative terminal integrally formed portion 214 are at opposite ends of the battery 200.

It can be noted that top section 291 has a C-shape when viewed in cross section taken across its width. Similarly bottom section 210 has a C-shape when viewed in cross section taken across its width. Thus, sections 291 and 210 can be conveniently referred to as C-clamp sections which form outer housing 290, since these two section can be clamped around the internal cell components in order to from outer housing 290. The interface 297 (FIG. 2A) between edge 296 of the top section 291 and edge 216 of the bottom section 210 can be welded to provide a tight permanent outer housing 290 around the internal cell components.

The internal cell components are shown best in FIG. 2 whereas the assembled battery is shown in FIG. 2A and the cross sections of FIGS. 2B and 2C. The battery 200 comprises three individual alkaline cells A,B and C (FIGS. 2, 2B and 2C) electrically connected in parallel. Each cell has two opposing major surfaces and a peripheral edge surface therebetween. Each individual cell comprises a cathode 280 comprising $MnO_2$, and anode 260 comprising zinc, and separator 270 therebetween. Separator 270 is permeable to alkaline electrolyte, preferably aqueous potassium hydroxide. Cathode 280 and anode 260 in each individual cell are preferably in the form of a slab having at least a major portion of their surface flat. Anode slab 260, separator 270, and cathode slab 280 of each cell are stacked body to body (as in a stack of coins) as shown in FIG. 2. The phrase anode and cathode slabs stacked "body to body" as used herein with respect to all embodiments shall be understood to mean that the anode and cathode are stacked one on top of the other (with the separator therebetween) so that a major surface of the anode and a major surface of the cathode are adjacent to and face each other (as in a stack of coins). Each cell is preferably of cuboid shape, preferably of small thickness. In that shape the two opposing major surfaces are the opposing large faces of the cuboid and the peripheral edge surface is the surface therebetween running along the cell thickness. Anode 260 and cathode 280 are in the shape of a rectangular slab of small thickness. The separator 270 (FIG. 2) has upwardly extending edges 272 so that as the cathode 280 is placed onto the separator 270, the separator 270 surface contacts the lower surface of the cathode and the separator edges 272 extends upwardly to cover the edges 282 of the cathode. Each of the three cells, A, B, and C have the same components and are fabricated in the same manner. The exploded view of FIG. 2 shows the components of a representative cell "A", but it will be appreciated that the description herein of the cell components of cell "A" applies equally to the remaining two cells.

It is known that hydrogen gas is released during alkaline cell discharge. In conventional cylindrical cells having an anode comprising zinc, a cathode comprising manganese dioxide and aqueous potassium hydroxide electrolyte, the pressure buildup can reach levels of between about 800 and 1500 psig depending on cell size and additives employed in the anode/cathode. The small flat housing shape shown in the battery of the invention (FIG. 2A) must also withstand significant gas pressures which can occur during normal discharge of the cell. The pressures can be in a range typically between 500 and 1000 psig. Such pressures can cause electrolyte to press against the interior of walls of metal outer housing 290. Since outer housing 290 is of small thickness 15 mil (0.037 mm) the pressure of gas and electrolyte against the housing walls could cause the housing to bulge or rupture releasing electrolyte to the environment. This would pose an undesirable situation. In order to avoid such leakage of electrolyte the individual cells A, B, and C shown in FIGS. 2, 2B, and 2C are encased within a plastic casing 220.

The plastic casing for the individual cells comprises a rectangular shaped plastic tray 220 with ribs 226 (FIGS. 2B and 2C) extending upwardly from the tray bottom surface and into the tray interior space. The ribs 226 extend across the width of the interior of plastic tray 220. Ribs 226 thus form three separate compartments for housing each of the three cells, respectively. The three cells are thus aligned in a row edge to edge (like floor tile) within plastic tray 220 with the cells separated by ribs 226.

The tray 220 is fitted with a plastic tray cover 250 which can be solvent bonded or ultrasonically welded or glued to the top edge of tray 220. Tray 220 and tray cover 250 are formed of plastic material which is desirably permeable to hydrogen gas but will prevent electrolyte from escaping to the environment outside of the tray boundary. This prevents leakage of electrolyte from the battery. Preferred plastic material for tray 220 and tray cover 250 is gas permeable polyethylene, polypropylene, nylon, and polysulfone. Outer metal housing 290 is not hermetically sealed. There are therefore very small pathways or openings (not shown) at the positive terminal end 295 or negative terminal end 214 (or both) through which hydrogen gas buildup from within the cell, once it permeates through plastic tray 220 and tray cover 250, can release to the external environment.

Electrical connection of the cathode 280 of each cell to the positive terminal 294 is made in the following manner: The plastic tray cover 250 has one aperture 252 thererthrough for each of the cells. Aperture 252 is aligned with the center of cathode 280. A disk shaped metal pass thru conductor 240 having a protruding tip 242 is positioned against the underside surface of plastic tray cover 250. A sealing ring (O-ring) 243 is placed onto the top surface of disk 240. Tip 242 of conductor disk 240 protrudes through sealing ring 243. The tip 242 of conductor disk 240 is pressed thru aperture 252 so that it protrudes from the top surface of tray cover 250 as shown best in FIG. 2B or FIG. 2C. The conductor disk 240 can be initially flat and tip 242 can be formed with an awl or punch used to press the top surface of the disk 240 through aperture 252. The tip 242 formed in this process passes clear thru aperture 252 so that it protrudes from the top surface of tray cover 250. The body of the disk remains pressed against the underside surface of tray cover 250 with the sealing ring 243 therebetween as shown best in FIG. 2B or 2C. Sealing ring 243 can be of resilient rubber material which provides a tight seal between the disk 240 and plastic tray cover 250. A cross section of a representative assembled cell is shown best in FIG. 2C. To enhance electrical conduction between the cathode 280 and pass thru conductor disk 240, the cathode may be provided with a thin sheet of metal 284 (FIGS. 2B and 2C) on the side of the cathode in contact with conductor disk 240. As may be seen from FIG. 2C, tip 242 of conductor disk 240 is in physical contact with outer housing 290 and the base of disk 240 is seated against cathode 280, preferably in a recessed area 286 (FIG. 2) within the top surface of cathode 280. Outer housing 290 is in electrical contact with positive terminal 295 as previously described and as shown best in FIG. 2C. Therefore, cathode 280 is also in electrical contact with positive terminal 295 because conductor disk 240 contacts both cathode 280 and outer housing 290 (FIG. 2C). All cells, i.e. cells A,B, and C (FIG. 2A) are connected in the same manner as the representative cell above described. The cathodes 280 of each cell are thus all electrically connected to positive terminal 295.

The anode 260 of the representative cell shown in exploded view (FIG. 2) is electrically connected to the bottom section 210 of the outer housing 290. The connection is made by employing a pass thru conductor disk 230 similar to the cathode conductor disk 240. The plastic tray 220 has one aperture 237 threrethrough for each of the cells. Aperture 237 is aligned with the center of anode 260. A disk shaped metal pass thru conductor 230 having a protruding tip 232 is positioned in in alignment with and above aperture 237 at the base of plastic tray 220 as shown in FIG. 2. A sealing ring (O-ring) 233 is placed around aperture 237 and facing conductor disk 230. Tip 232 protrudes downwardly from conductor disk 230. The tip 232 of conductor disk 230 is pressed thru aperture 237 so that it passes through sealing ring 233 and passes clear through aperture 237 a the base of plastic tray 220 as shown best in FIG. 2B or FIG. 2C. The conductor disk 230 can be initially flat and tip 232 can be formed with an awl or punch used to press the bottom surface of disk 230 through aperture 237. The tip 232 formed in this process passes clear thru aperture 237 so that it protrudes from the bottom plastic tray 220. The body of the disk remains pressed against the bottom of tray 220 with the sealing ring 233 therebetween as shown best in FIG. 2B or 2C. Sealing ring 233 can be of resilient rubber material which provides a tight seal between the disk 230 and plastic tray 220. This occurs when plastic cover 250 is sealed to plastic tray 220 keeping the cells tightly housed within the plastic tray 220.

The bottom section 210 of housing 290 is in electrical contact with negative 214 terminal 214 as previously described and as shown best in FIG. 2C. Therefore, anode 260 is also in electrical contact with negative terminal 214 because conductor disk 230 contacts both anode 260 and housing bottom section 210 (FIG. 2B). All cells, i.e. cells A,B, and C (FIG. 2A) are electrically connected in the same manner as the representative cell above described. The anodes 260 of each cell are thus all electrically connected to the battery's negative terminal 214. The cathodes 280 as above described are each electrically connected to the battery's positive terminal 295. Each cell is thus electrically connected in parallel.

Third Embodiment (FIGS. 3–3C)

Another embodiment of the flat alkaline primary battery of the invention is shown in FIGS. 3–3C. In a preferred embodiment the battery shown in FIGS. 3–3C has the overall shape of a cuboid (rectangular parallelepiped) of size the same or similar to an F6 size (IEC standard) rechargeable battery. Such battery has the overall rectangular shape shown in FIG. 3A with a length of 67 mm, width of 17 mm and thickness of 6 mm. In particular the battery of the invention shown in FIGS. 3–3C can be used as a direct replacement for the 7/5F6 size nickel metal hydride rechargeable batteries as power source for the mini disk Walkman player model MZ-900 from Sony Corp. Such replacement service is offered by way of example and is not intended to be limiting. The embodiment of the battery shown in FIGS. 3–3C can be made in larger or smaller sizes.

The embodiment of FIGS. 3–3C shows the components of three cells electrically connected in parallel to form battery 300. However, it will be appreciated that there can be fewer cells, for example 2 cells, or a greater amount, for example 4 or 5 cells, all fabricated in the same manner with the same internal components shown and described with respect to the embodiment shown in FIGS. 3–3C.

The components of this embodiment is shown best in the exploded view of FIG. 3. The outer housing 305 is composed of a thin metal sheet 307 preferably nickel plated cold rolled steel having a thickness preferably of between about 5 to 6 mil (0.125 to 0.15 mm). The sheet 307 is wrapped around the battery internal components to form the outer housing 305 for the battery shown in FIG. 3A. The free edges 308 and 309 of the metal sheet can be spot welded or glued after wrapping to from the finished outer housing 305. Housing 305 is itself open at both ends. The anode 360 of each cell is in electrical contact with outer housing 305. Thus, housing 305 is electrically negative. A negative terminal plate 398 shown in FIG. 3B is welded to the housing 305 to close one of the open ends. The opposite end of housing 305 is closed with positive terminal 394 which is separated from physical contact with housing 305 by an insulating material, preferably in the form of an insulating plate 392 whose edges lie between the edge of positive terminal 394 and housing 305 as shown best in FIG. 3C. Positive terminal 394 can be welded or glued to the central portion of insulating plate 392.

The internal cell components are shown best in FIG. 3 whereas the assembled battery is shown in FIG. 3A and in cross sections of FIGS. 3B and 3C. The battery 300 comprises three individual alkaline cells A,B and C (FIGS. 3B and 3C) electrically connected in parallel. Each cell has two opposing major surfaces and a peripheral edge surface therebetween. Each individual cell comprises a cathode 380 comprising $MnO_2$, and anode 360 comprising zinc, and separator 370 therebetween. Separator 370 is permeable to alkaline electrolyte, preferably aqueous potassium hydroxide. Cathode 380 and anode 360 in each individual cell are preferably in the form of a slab having at least a major portion of their surface flat. Anode 360, separator 370, and cathode 380 of each cell are stacked body to body (as in a stack of coins) as shown in FIG. 3. The phrase anode and cathode slabs "stacked body to body" as used herein with respect to all embodiments shall be understood to mean that the anode and cathode are stacked one on top of the other (with the separator therebetween) so that a major surface of the anode and a major surface of the cathode are adjacent to and face each other (as in a stack of coins). Each cell is desirably of cuboid (rectangular parallelepiped) shape, preferably of small thickness. In that shape the two opposing major surfaces are the opposing large faces of the cuboid and the peripheral edge surface is the surface therebetween running along the cell thickness. Anode 360 and cathode 380 are in the shape of a rectangular slab of small thickness. The separator 370 (FIG. 3) has upwardly extending edges 372 so that as the cathode 380 is placed onto the separator 370, the separator surface contacts the lower surface of the cathode and the separator edges 372 extends upwardly to cover the edges 382 of the cathode. Each of the three cells, A, B, and C has the same components and are fabricated in the same manner. The exploded view of FIG. 3 shows the components of a representative cell "A", but it will be appreciated that the description herein of the cell components of cell "A" applies equally to the remaining two cells.

The plastic container for the individual cells comprises a rectangular shaped plastic tray 320 with ribs 326 (FIGS. 3B and 3C) extending upwardly from the tray bottom surface and into the tray interior space. The ribs 326 extend across the width of the interior of plastic tray 320. Ribs 326 thus form three separate compartments for housing each of the three cells, respectively. The three cells are thus aligned in a row, edge to edge (like floor tile), within plastic tray 320 with the cells separated by ribs 326.

The plastic tray 320 is fitted with a plastic tray cover 390. The plastic tray cover 390 can be solvent bonded or ultrasonically welded or glued to the top edge of tray 320 after the cell components have been inserted into tray 320. Plastic tray 320 and tray cover 390 are formed of plastic material which is desirably permeable to hydrogen gas but will prevent electrolyte from escaping to the environment outside of the tray boundary. This prevents leakage of electrolyte from the battery. Preferred plastic material for tray 320 and tray cover 390 is gas permeable polyethylene, polypropylene, nylon, and polysulfone. Outer housing 305 is not hermetically sealed. There are tiny pathways (not shown) around the positive terminal support plate 392 through which hydrogen gas buildup from within the cell, once it permeates through plastic tray 320 and tray cover 390, can release to the external environment.

Electrical connection of the cathode 380 of each cell to the positive terminal 394 is made in the following manner: The plastic tray cover 390 has one aperture 395 thererthrough for each of the cells. Aperture 395 is aligned with the center of cathode 380. The cathode 380 can be seated within separator 370. A disk shaped metal pass thru conductor 340 having a protruding tip 342 is positioned against the underside surface of plastic tray cover 390. A sealing ring (O-ring) 343 is placed onto the top surface of disk 340. Tip 342 of conductor disk 340 protrudes through sealing ring 343. The tip 342 of conductor disk 340 is pressed through aperture 395 so that it protrudes from the top surface of tray cover 390 as shown best in FIG. 3B or FIG. 3C. The conductor disk 340 can be initially flat and tip 342 can be formed with an awl or punch used to press the top surface of the disk 340 through aperture 395. The tip 342 formed in this process passes clear through aperture 395 so that it protrudes from the top surface of tray cover 390. The body of the disk remains pressed against the underside surface of tray cover 390 with the sealing ring 343 therebetween as shown best in FIG. 3B or 3C. Sealing ring 343 can be of resilient rubber material which provides a tight seal between the conductor disk 340 and plastic tray cover 390. After tip 342 of conductor disk 340 is punched through aperture 395, tip 342 protruding from aperture 395 is secured by welding it to an external washer 344 as shown in FIGS. 3B and 3C. With reference to FIG. 3, the top surface of cathode 380 within recessed area 386 can then be pressed against the bottom of conductor disk 340 so that when the cell is fully assembled (FIGS. 3B and 3C) the cathode 380 is in physical contact with conductor disk 340.

In the assembled representative cell (FIG. 3C) there is an insulating strip 350 inserted between washer 344 and the housing 305. This prevents the cathode 380 from coming into electrical contact with metal housing 305 which is negative. Electrical connection between washer 344 and positive terminal 394 is made by connecting these two elements with an electrically conductive element 363 such as a metal wire or metal strip 363 (FIG. 3C). Metal conductor strip 363 can terminate in a downwardly extending surface 362 at the end closest to the positive terminal 394 for attachment or welding thereto. The metal strip 363 can be a metallic coating on the inside surface of insulator strip 350 facing the cell interior. In such case as the insulator strip 350 is pressed onto external washer 344, one end of the metal strip 363 contacts the washer 344 and the other end can be welded to positive terminal 394. Alternatively, a separate metal wire or metal strip 363 can be welded at one end to washer 344 and at the other end to positive terminal 394. As previously mentioned the positive terminal 394 is insulated from contact with the negative housing 305 by an insulating plate or disk 392 between the terminal 394 and housing 305.

The anode 360 of the representative cell shown in exploded view (FIG. 3) is electrically connected to the outer housing 305 which becomes thereby electrically negative. The connection is made by employing a pass thru conductor disk 330 similar to the cathode conductor disk 340. The plastic tray 320 has one aperture 337 passing therethrough for each of the cells. Aperture 337 is aligned with the center of anode 360. A disk shaped metal pass thru conductor 330 having a protruding tip 332 is positioned in alignment with and above aperture 337 at the base of plastic tray 320 as shown in FIG. 3. A sealing ring (O-ring) 333 is placed around aperture 337 and facing conductor disk 330. Tip 332 protrudes downwardly from conductor disk 330. The tip 332 of conductor disk 320 is pressed thru aperture 337 so that it passes through sealing ring 333 and passes clear through aperture 337 a the base of plastic tray 320 (FIG. 3B or FIG. 3C). The conductor disk 330 can be initially flat and tip 332 can be formed with an awl or punch used to press the bottom surface of disk 330 through aperture 337. The tip 332 formed in this process passes clear thru aperture 337 so that it protrudes from the bottom plastic tray 320. The body of the disk remains pressed against the bottom of tray 320 with the sealing ring 333 therebetween as shown best in FIG. 2B or 2C. Sealing ring 333 can be of resilient rubber material which provides a tight seal between the conductor disk 330 and plastic tray 320. An outer washer 334 (FIGS. 3B and 3C) is placed over the protruding tip 332 and is welded thereto. The outer washer thus keeps tip 332 from slipping out of tray aperture 337. After the cells are assembled and outer metal sheeting 305 is wrapped around the individual cells the outer washer 334 comes into physical contact with sheeting 305. Thus there is electrical contact with anode 360 and outer housing 305 by means of contact between pass thru conductor disk 330 and external washer 334. The end terminal 398 in contact with housing 305 thus becomes the battery's negative terminal.

All cells, i.e. cells A,B, and C (FIG. 2A) are electrically connected in the same manner as the representative cell above described. A representative assembled cell is shown best in FIG. 3C. The anodes 360 of each cell are thus all electrically connected to housing 305 and in turn to the battery's negative terminal 398. The cathodes 380 are insulated from housing 305 and are all electrically connected to the positive terminal 394. Each cell is thus electrically connected in parallel.

Chemical Composition of a Representative Cell

The following description of cell composition, that is, chemical composition of anode, cathode and separator is applicable to each of the cells described in the above disclosed specific embodiments. Specifically the following description of cell composition applies to the single cell of the first embodiment (FIGS. 1–1A) comprising anode 140, cathode 160 and separator 150 therebetween; the second embodiment (FIGS. 2–2C) having identical cells A,B, and C each comprising anode 260, cathode 280 and separator 270 therebetween; and the third embodiment (FIGS. 3–3C) having identical cells A,B, and C each comprising anode 360, cathode 380, and separator 370 therebetween.

Each cell is filled with a cathode comprising manganese dioxide, and an anode comprising zinc and electrolyte. The aqueous electrolyte comprises a conventional mixture of KOH, zinc oxide, and gelling agent. The anode material (140, 260, and 360) can be in the form of a gelled mixture containing mercury free (zero-added mercury) zinc alloy powder. That is, each cell has a total mercury content less than about 50 parts per million parts of total cell weight, preferably less than 20 parts per million parts of total cell weight. The cell also preferably does not contain any added amounts of lead and thus is essentially leadfree, that is, the total lead content is less than 30 ppm, desirably less than 15 ppm of the total metal content of the anode. Such mixtures can typically contain aqueous KOH electrolyte solution, a gelling agent (e.g., an acrylic acid copolymer available under the tradename CARBOPOL C940 from B. F. Goodrich), and surfactants (e.g., organic phosphate ester-based surfactants available under the tradename GAFAC RA600 from Rhône Poulenc). Such a mixture is given only as an illustrative example and is not intended to restrict the present invention. Other representative gelling agents for zinc anodes are disclosed in U.S. Pat. No. 4,563,404.

The cathode (160, 280, and 380) desirably has the following composition:

87–93 wt % of electrolytic manganese dioxide (e.g., Trona D from Kerr-McGee), 2–6 wt % (total) of graphite, 5–7 wt % of a 7–10 Normal aqueous KOH solution having a KOH concentration of about 30–40 wt %; and 0.1 to 0.5 wt % of an optional polyethylene binder. The electrolytic manganese dioxide typically has an average particle size between about 1 and 100 micron, desirably between about 20 and 60 micron. The graphite is typically in the form of natural, or expanded graphite or mixtures thereof. The graphite can also comprise graphitic carbon nanofibers alone or in admixture with natural or expanded graphite. Such cathode mixtures are intended to be illustrative and are not intended to restrict this invention.

The anode material (140, 260, 360) comprises: Zinc alloy powder 62 to 69 wt % (99.9 wt % zinc containing indium), an aqueous KOH solution comprising 38 wt % KOH and about 2 wt % ZnO; a cross-linked acrylic acid polymer gelling agent available commercially under the tradename "CARBOPOL C940" from B. F. Goodrich (e.g., 0.5 to 2 wt %) and a hydrolyzed polyacrylonitrile grafted onto a starch backbone commercially available commercially under the tradename "Waterlock A-221" from Grain Processing Co. (between 0.01 and 0.5 wt. %); dionyl phenol phosphate ester surfactant available commercially under the tradename "RM-510" from Rhone-Poulenc (50 ppm). The zinc alloy average particle size is desirably between about 30 and 350 micron. The bulk density of the zinc in the anode (anode porosity) is between about 1.75 and 2.2 grams zinc per cubic centimeter of anode. The percent by volume of the aqueous electrolyte solution in the anode is between about 69.2 and 75.5 percent by volume of the anode.

The cell can be balanced in the conventional manner so that the mAmp-hr capacity of $MnO_2$ (based on 308 mamp-hr per gram $MnO_2$) divided by the mAmp-hr capacity of zinc alloy (based on 820 mAmp-hr per gram zinc alloy) is about 1.

The separator (150, 270, and 370) can be a conventional ion porous separator consisting of an inner layer of a nonwoven material of cellulosic (rayon) and polyvinylalcohol fibers and an outer layer of cellophane. Such a material is only illustrative and is not intended to restrict this invention.

Total Anode/Cathode Volume as Percent of External Volume of Outer Housing

In the first specific embodiment (FIGS. 1–1A) by way of a specific non limiting example, the battery 100 is fabricated so that the outer housing 105 has the overall dimensions length 67 mm; width 17 mm; thickness 6 mm resulting in an external volume of 6.834 $cm^3$. The anode 140 has a thickness of 1.77 mm and volume of 1.480 $cm^3$. The anode 140 comprises a final volume which is about 21.7 percent of the outer housing 105 external volume. The cathode 160 is comprised of four pellets (160a–160d) aligned edge to edge (like floor tile) and compacted into one cathode as shown in FIG. 1. The cathode 160 has a final thickness of 3.05 mm and final volume of about 2.484 $cm^3$. The cathode 160 therefore comprises a final volume which is about 36.3 percent of the outer housing 105 external volume. The combined final volume of the total cathode and anode is 58.0 percent of the outer housing 105 external volume.

In the second specific embodiment (FIGS. 2–2C) by way of a specific non limiting example, the battery 200 is fabricated so that the outer housing 105 has the overall dimensions length 67 mm; width 17 mm; thickness 6 mm resulting in an external volume of 6.834 $cm^3$. Battery 200 comprises three cells, A,B, and C electrically connected in parallel. The total anode comprising three anode pellets 260 connected in parallel has a thickness of 1.77 mm and a total volume of 1.324 $cm^3$. The anode comprises a final volume which is about 19.4 percent of the outer housing 290 external volume. The total cathode comprising three cathode pellets 280 and has a final thickness of 2.30 mm and final volume of about 2.217 $cm^3$. The total cathode therefore comprises a final volume which is about 32.4 percent of the outer housing 290 external volume. The combined final volume of the total cathode and anode is 51.8 percent of the outer housing 290 external volume.

In the third specific embodiment (FIGS. 3–3C) by way of a specific non limiting example, the battery 300 is fabricated so that the outer housing 305 has the overall dimensions length 67 mm; width 17 mm; thickness 6 mm resulting in an external volume of 6.834 $cm^3$. Battery 300 comprises three cells, A,B, and C electrically connected in parallel. The total anode comprising three anode pellets 360 connected in parallel has a thickness of 1.47 mm and a total volume of 1.430 $cm^3$. The anode comprises a final volume which is about 20.9 percent of the outer housing 305 external volume. The total cathode comprising three cathode pellets 380 and has a final thickness of 2.45 mm and final volume of about 2.410 $cm^3$. The total cathode therefore comprises a final volume which is about 35.3 percent of the outer housing 305 external volume. The combined final volume of the total cathode and anode is 56.2 percent of the outer housing 305 external volume.

In comparing the attributes of the above described three specific embodiments of the flat alkaline battery of the invention, it will be observed that battery 100 (FIGS. 1–1A) has an advantage in that the total active material (total anode and cathode) comprises a higher percent volume of the battery. Therefore battery 100 has a higher capacity than battery 200 or battery 300 in normal range of service spanning the range from low to high drain service. In particular battery 100 will have a higher capacity in the 100 to 300 mAmp drain service requirements of MP3 or microdisk players. On the other hand the segmented cell design of battery 200 (FIGS. 2–2C) or battery 300 (FIGS. 3–3C) has greater structural integrity in that the anode and cathodes of the individual cells are less prone to cracking during the assembly process or during transit than the single cell design of battery 100. Battery 200 more closely approaches the total volume of anode and cathode and thus total capacity of the single cell design reflected in battery 100.

It will be appreciated that the above values for total volume of anode and cathode as a percent of external volume of the outer metal housing are very conservative, as they are not based on an optimized design. It is believed possible to increase the percent volume of total anode and cathode up to about 75 percent and even as high as about 80 percent of the external volume of the outer metal housing. Thus, total anode and cathode volume can comprise between about 50 and 75 percent, even as much as between about 50 and 80 percent of the external volume of the outer metal housing. This is believed achievable by compacting the cell components more tightly and by reducing the thickness of the plastic casing (120 and 180; 220 and 250; 320 and 390) as well as the metal current collectors, e.g. cathode current collector 170 and conductor strips, e.g. 190, 130, 363 and insulators, e.g., 198 and 350.

As yet another alternative design to the above described specific embodiments, it will be appreciated that the individual cells A,B, or C shown in FIGS. 2–2C or FIGS. 3–3C can each be enclosed in a separate plastic tray. Thus, in such embodiment, instead of having a single plastic tray, e.g., plastic tray 220 (FIG. 2) or plastic tray 320 housing three cells each of the cells can instead be housed in their own plastic encasement. Such plastic encasement will desirably be of plastic material such porous polyethylene, polypropylene, nylon or polysulfone permeable to hydrogen. The individual plastic encasement for each cell can be formed by encasing each cell in a tightly fitting plastic container which is covered by a separate plastic cover in manner analogous to the tray 220 and cover 250 design shown in FIG. 2. The plastic cover can be welded to the peripheral edge of the container by ultrasonic welding, infrared welding, by solvent bonding or by use of adhesive. Each cell can be provided with a positive pass thru conductor in contact with the cathode (as in conductor 240, FIG. 2) and a negative pass thru conductor (as in conductor 230, FIG. 2) in contact with the anode before the plastic cover is sealed to the plastic tray. The top cover of the plastic encasement for each cell can be provided with an aperture such as aperture 252 (FIG. 2) for electrical connection of the protruding positive pass thru conductor to the positive terminal. Similarly, the plastic container (tray) for each cell can be provided with an aperture such as aperture 237 (FIG. 2) for electrical connection of the protruding negative pass thru conductor to the negative outer housing. The remaining components of such alternative battery embodiment can be the same or similar to that disclosed and described with respect to the embodiments shown in FIG. 1, 2 or 3. The main difference is that the alternative battery embodiment comprises a plurality of individual alkaline cells, for example, between two and four individual cells, wherein each cell is encased in its own hydrogen permeable plastic container.

The latter alternative embodiment has the advantage that flat alkaline batteries of varying size can be readily fabricated by inserting therein any number of the desired prefabricated size unit cells, each cell being encased in its own protective plastic encasement. Thus, the size of the battery can be readily altered by prefabricating several different size individual cells each encased in its own protective plastic container and inserting the desired number of such cells into an outer housing to achieve the desired battery length.

Although the preferred embodiments of the invention have been described with respect to a flat alkaline battery having the overall shape of a cuboid (rectangular parallelepiped), it will be appreciated that variations of such overall shape are possible and are intended to fall within the concept of the invention. For example, the terminal ends of the rectangular parallelepiped battery of the invention can be slightly outwardly or inwardly curved. The overall appearance of such varied shape is still substantially that of a cuboid and is intended to fall within the meaning of cuboid or legal equivalent thereof. Other variation to the overall shape such as altering somewhat the angle that the ends of the battery make with any one of the parallelgrams comprising the battery body so that the parallelepiped is a deviation from strict rectangular is also intended to fall within the meaning of cuboid (rectangular parallelepiped) as used herein and in the claims.

The present invention is intended to extend to an overall battery shape that is flat in that a major portion of the battery housing comprises at least one substantially flat surface. The thickness of the battery housing is typically relatively small in comparison to the length of the battery. In particular the concept of the present invention is intended to extend to substantially flat batteries wherein a major portion of the battery housing comprises a flat polygonal surface. The invention is also intended to extend to batteries wherein a major portion of the battery housing has a flat surface which is a parallelogram and wherein the overall shape of the battery is prismatic.

Thus, the invention is not intended to be limited to the specific embodiments herein described, but is better defined by the claims and equivalents thereof.

What is claimed is:

1. An alkaline battery comprising a plurality of individual alkaline cells, said battery comprising a metal elongated housing having a major portion of its surface substantially flat; wherein said alkaline cells are contained within the interior of said metal elongated housing; wherein each of said cells comprises an anode slab, a cathode slab and separator therebetween; said anode and cathode stacked in body to body arrangement with said separator therebetween; wherein each of said cells has a pair of opposing major outer surfaces, at least one of which is polygonal; wherein one of said opposing major outer surfaces forms a portion of the anode and the other forms a portion of the cathode; wherein a peripheral edge surface of each of said cells lies between said pair of opposing major outer surfaces; wherein the distance between said pair of opposing major outer surfaces of each of said cells defines the thickness of each of said cells, respectively; and wherein said cells are encased in a casing and aligned therein so that a portion of the peripheral edge surface of one cell is adjacent a portion of the peripheral edge surface of the next cell to from a pack of cells; wherein said pack of cells and said casing are housed within the interior of said metal elongated housing.

2. The alkaline battery of claim 1 wherein said peripheral edge surface of each cell runs between the cell thickness.

3. The alkaline battery of claim 1 wherein said cells are about the same shape and size and the cells are aligned so that the thickness of the pack of cells is about the same as the thickness of each cell.

4. The alkaline battery of claim 1 wherein said cells are encased in a common plastic casing, said plastic casing being permeable to hydrogen.

5. The alkaline battery of claim 4 wherein there are ribs within said plastic casing separating said peripheral edge surfaces of aligned adjacent cells.

6. The alkaline battery of claim 1 wherein each cell comprises an anode comprising zinc and a cathode comprising manganese dioxide.

7. The alkaline battery of claim 1 wherein the cells are electrically connected in parallel.

8. The alkaline battery of claim 1 wherein the metal elongated housing has a polyhedron shape.

9. The alkaline battery of claim 8 wherein each of said cells has a polyhedron shape.

10. The alkaline battery of claim 1 wherein the metal housing comprises an elongated body surface and two opposing end surfaces; wherein a major portion of said body surface has a flat polygonal shape.

11. The alkaline battery of claim 1 wherein the metal housing comprises and elongated body surface and two opposing end surface; wherein said metal housing has a cuboid shape.

12. The alkaline battery of claim 1 wherein said pair of opposing major surfaces of each of said cells has a flat polygon shape.

13. The alkaline battery of claim 1 wherein said pair of opposing major surfaces of each of each of said cells has a flat rectangular shape.

14. The alkaline battery of claim 1 wherein each of said cells has a cuboid shape.

15. The alkaline battery of claim 14 wherein the anode and cathode in each of said cells has a cuboid shape.

16. The alkaline battery of claim 4 wherein the number of cells contained within said common plastic casing is between 3 and 5.

17. The alkaline battery of claim 1 wherein the volume of the anode and cathode material within the total number of cells within said metal elongated housing is between about 50 and 75 percent of the external volume of said metal elongated housing.

18. The alkaline battery of claim 11 wherein the overall dimensions of the battery are 6 mm thickness; 17 mm width; and 67 mm length.

19. The alkaline battery of claim 1 wherein the metal elongated housing comprises two sections wherein one is applied to cover the top of said casing along the length of said casing and the second is applied to cover the bottom of said casing along the length of said casing and the edges of the two sections are sealed to each other so that said casing is encased within said metal housing.

20. The alkaline battery of claim 1 wherein the metal elongated housing comprises a sheet of metal which is wrapped around said casing.

21. The alkaline battery of claim 1 wherein the metal material forming the housing is selected from the group consisting of nickel plated cold rolled steel and stainless steel.

22. The alkaline battery of claim 4 wherein said plastic casing is permeable to hydrogen and selected from the group consisting of porous polyethylene, porous polypropylene, nylon and polysulfone.

23. The alkaline battery of claim 1 wherein said battery is a primary nonrechargeable battery.

24. A primary alkaline battery comprising a metal elongated housing, a positive and a negative terminal, and a plurality of individual alkaline cells; wherein said alkaline cells are encased in a hydrogen permeable casing and are electrically connected in parallel to said positive and negative terminals; wherein said cells and said casing are housed within the interior of said metal elongated housing.

25. The alkaline cell of claim 24 wherein said hydrogen permeable casing comprises plastic.

26. The alkaline battery of claim 24 wherein each cell comprises an anode comprising zinc, a cathode comprising manganese dioxide, a separator therebetween and electrolyte comprising aqueous potassium hydroxide.

27. The alkaline battery of claim 24 wherein each of said cells is in the shape of a cuboid.

28. The alkaline battery of claim 24 wherein said metal elongated housing is the shape of a cuboid.

\* \* \* \* \*